United States Patent
Leeb (10) Patent No.: US 9,832,925 B2
(45) Date of Patent: Dec. 5, 2017

(54) DEVICE FOR APPLYING LIQUID AND/OR SOLID ACTIVE SUBSTANCES AND METHOD FOR CONTROLLING A DEVICE OF THIS TYPE

(71) Applicant: HORSCH LEEB Application Systems GmbH, Oberpöring (DE)

(72) Inventor: Theodor Leeb, Wallersdorf (DE)

(73) Assignee: HORSCH LEEB APPLICATION SYSTEMS GMBH (DE)

( * ) Notice: Subject to any disclaimer, the term of this patent is extended or adjusted under 35 U.S.C. 154(b) by 0 days.

(21) Appl. No.: 15/029,114

(22) PCT Filed: Oct. 14, 2014

(86) PCT No.: PCT/EP2014/072057
§ 371 (c)(1),
(2) Date: Apr. 13, 2016

(87) PCT Pub. No.: WO2015/055680
PCT Pub. Date: Apr. 23, 2015

(65) Prior Publication Data
US 2016/0249526 A1 Sep. 1, 2016

(30) Foreign Application Priority Data

Oct. 14, 2013 (DE) .................. 10 2013 111 324

(51) Int. Cl.
*G06F 19/00* (2011.01)
*A01C 23/04* (2006.01)
(Continued)

(52) U.S. Cl.
CPC ............ *A01C 23/047* (2013.01); *A01B 63/32* (2013.01); *A01G 1/001* (2013.01); *A01G 25/09* (2013.01); *A01G 25/16* (2013.01); *A01M 7/0057* (2013.01)

(58) Field of Classification Search
CPC ..... A01M 7/0057; A01G 25/16; A01G 25/09; A01G 1/001; A01B 63/32; A01C 23/047; B60P 3/30
(Continued)

(56) References Cited

U.S. PATENT DOCUMENTS 2,610,076 A * 9/1952 Walsh ................. A01M 7/0053
16/287
3,887,132 A * 6/1975 Widmer .................. A01M 7/00
239/166
(Continued)

FOREIGN PATENT DOCUMENTS

| DE | 1833453 U | 6/1961 |
|----|-----------|--------|
| DE | 3202569 A1 | 8/1983 |
| DE | 4140254 A1 | 6/1993 |
| DE | 202007011631 U1 | 10/2007 |
| DE | 102007025751 A1 | 12/2008 |
| DK | 2559332 T3 | 3/2015 |
| EP | 0157592 A2 | 10/1985 |
| EP | 2186405 A1 | 5/2010 |
| EP | 2559332 A1 | 2/2013 |
| EP | 2591657 A1 | 5/2013 |
| FR | 2270774 A1 | 12/1975 |
| FR | 2779031 A1 | 12/1999 |
| FR | 2965453 A1 | 4/2012 |
| WO | 2004041446 A1 | 5/2004 |

OTHER PUBLICATIONS

Translation of International Search Report dated Jan. 12, 2015 in International Application No. PCT/EP2014/072057.
Translation of Written Opinion dated Jan. 12, 2015 in International Application No. PCT/EP2014/072057.

*Primary Examiner* — Gertrude Arthur Jeanglaude
(74) *Attorney, Agent, or Firm* — Erickson Kernell IP, LLC (57) ABSTRACT

A device for spreading liquid and/or solid active agents comprises a carrier vehicle, at least one pivotable boom, and sensors for detecting an angular velocity and/or an angular position of the boom. A control unit processes output signals of the sensors to control signals for an actuator to adjust the boom. The actuator produces an actuating connection between the carrier vehicle and the pivotable boom, and has one active pressure side, which is engageable by fluidic actuating pressure, for each of the two adjustment directions of the boom. An approximately equal pressure prevails on the active pressure sides of two actuators operating in opposition or of a double-acting actuator, respectively, when the boom is stationary or moves only slightly in relation to the carrier vehicle. A defined differential pressure is adjust- (Continued)

able between the active pressure sides of the two actuators or of a double-acting actuator, when the boom is shifted.

20 Claims, 4 Drawing Sheets (51) Int. Cl.
*A01M 7/00* (2006.01)
*A01B 63/32* (2006.01)
*A01G 1/00* (2006.01)
*A01G 25/09* (2006.01)
*A01G 25/16* (2006.01)

(58) Field of Classification Search
USPC .................................. 701/36, 50; 172/4.5, 9
See application file for complete search history.

(56) References Cited

U.S. PATENT DOCUMENTS

| | | | | | |
|---|---|---|---|---|---|
| 4,288,034 | A | * | 9/1981 | Widmer | ............... A01M 7/0075 239/159 |
| 4,886,208 | A | * | 12/1989 | Strand | .................... A01M 11/00 239/655 |
| 2013/0277442 | A1 | | 10/2013 | Ballu | |

* cited by examiner

DEVICE FOR APPLYING LIQUID AND/OR SOLID ACTIVE SUBSTANCES AND METHOD FOR CONTROLLING A DEVICE OF THIS TYPE

CROSS-REFERENCE TO RELATED APPLICATIONS

This application claims priority from German Application No. DE 10 2013 111 324.9 filed Oct. 14, 2013, the contents of which are incorporated herein by this reference.

FIELD

The present invention relates to a device for spreading liquid and/or solid active agents with the features of the independent claim 1. The invention furthermore relates to a method for controlling such a device with the features of the independent method claim 10.

BACKGROUND

Field sprayers and spray booms hitched to work machines, such as tractors, in some cases have very large working widths of more than 20 meters. Such wide spray booms are folded and collapsed in for transport purposes. In the field, symmetrical cantilevered arms of several meters length are located on both sides of the work machine, which cantilevered arms have a varying spacing from the ground according to surface conditions and field relief. Since the downward-directed nozzles for spreading a spraying agent, for example, a plant protection agent, which nozzles are arranged on the cantilevered arms, each have a defined spray cone, varying the spacing of the nozzles to the ground results in an uneven covering of the field with spraying agent. In addition, the danger of the spraying agent drifting greatly increases as the distance of the spray nozzles from the ground increases, since even slight air movements negatively affect the finely dispersed drops.

With increasing cantilever dimensions and the associated working width there is therefore a necessity to guide the spray boom at as uniform a spacing from the ground as possible, because minimal inclines of the spray boom will lead to large spacing differences of the nozzles to the ground.

In this context, it is known to suspend a spray boom from a carrier vehicle to be rotatable or pivotable about at least one axis of rotation about a central pivot point. The rotation or pivot axis in this instance preferably runs parallel to the longitudinal axis of the carrier vehicle. In order to ensure an even spreading of the spraying agent, the spacing between the top surface of the growth and the spray nozzles must be constantly controlled to a defined spacing. On horizontal agricultural fields, this can generally be achieved by self-leveling, in which the spray boom aligns itself in the horizontal plane with the center of gravity of the spray boom being located below the central pivot point and the spray boom being suspended, for instance, to be freely and swingingly rotatable. The desired effect will not occur, however, for agricultural fields running along a slope.

In order to constantly control to a defined spacing, the spacing between the top surface of the growth for agricultural fields running in any plane and the spray nozzles arranged on a spray boom pivotably suspended about a central pivot point, it is therefore known to pivot the spray boom, which is, for instance, raised to a desired spacing from the ground, about a pivot axis running through a central pivot point such that the spacing is optimized over the entire working width. For this purpose, an alignment changing torque has to be exerted on the spray boom about a pivot axis running through a central pivot point. This is carried out by means of at least one actuator, which transmits, at least as required, a force or a force couple affecting an alignment changing torque about a pivot axis from the carrier vehicle onto the spray boom in order to change the alignment of the spray boom.

This alignment changing torque accelerates the spray boom in a desired target rotational direction. Without countermeasures, the spray boom would continue to rotate about the pivot axis even after the impact of the alignment changing torque has ended, since the spray boom would retain its angular momentum due to the mass moment of inertia. In order to decelerate the spray boom, a braking torque in opposite to the previous alignment changing torque therefore has to be induced. This braking torque counteracts the rotary movement initiated by the alignment changing torque and thus damps the system of the spray boom rotatably suspended about the central pivot point.

Up to now, mechanical dampers, which are arranged between the carrier vehicle and the spray boom, are usually used for generating the braking torque. If, for instance, the carrier vehicle rotates about the pivot axis due to bumps, for example, and the spray boom stands still, this will also result in a relative rotation between the carrier vehicle and the spray boom. A mechanical damper arranged between the carrier vehicle and the spray boom would counteract this relative rotation and thus transmit a torque, acting about the pivot axis, to the spray boom, such that a coupling exists between carrier vehicle and spray boom.

The coupling likewise exists if a measuring system is used as a basis for regulating the torque, which measuring system measures a relative angle and/or a relative rotation between the carrier vehicle and the spray boom.

In addition, measuring systems are known, which use tilt sensors arranged on the spray boom for determining the position of the spray boom. The angular velocity of the spray boom can be acquired independently of the carrier vehicle from the temporal derivation of the tilt. In the instance of lateral accelerations such as occur, for example, when driving along curves, tilt sensors however provide an incorrect tilt. An incorrect angular velocity will therefore also be calculated.

A spray boom that has a cantilever put together from segments is already known from the prior art. DE 32 02 569 A1 thus discloses a distribution machine, in which individual segments are connected with each other and the movement of the individual segments is effected passively. For this mechanism, a supporting element is necessary on the outer side of each of the cantilevers in order to enable the pivoting process. In order to prevent loss of harvest, it is however desirable to achieve an adjustment of the individual segments with regard to different ground contours without being in direct contact with the ground.

DE 18 33 453 U furthermore discloses a spray boom comprising nozzle trees, which are arranged on a cantilever by means of elastic elements. By the elastic elements, the nozzle trees can recover a vertical position even after a pivoting process of the cantilever. According to that document, the cantilever is arranged to be pivotable about only one axis, so that the spray boom possesses only a limited flexibility. Due to the high degree of irregularity of ground structures occurring in practice, spray booms with a greater flexibility are desirable in order to ensure an even distribution of the spray liquid on the soil.

A spreading device for spreading liquid and/or solid active agents is known from DE 10 2007 025 751 A1. The spread device comprises a spreading boom arranged on a self-propelled or towed vehicle, which spreading boom is mounted to be pivotable about a suspension point approximately parallel to a driving direction. The spread boom consists of a middle part and lateral cantilevered arms. The middle part is coupled with a frame section of the vehicle via at least one controllable actuating apparatus. The actuating apparatus induces a defined actuating power and/or a defined actuating torque between the middle part and the frame section for the purpose of pivoting the spreading boom relative to the frame section. Inducement is carried out independently of disturbance torques resulting from vehicle movements.

An automated spreading device for spreading liquid and/or solid active agents, which is also referred to as an accompanying spreading device, is known from FR 2 779 031 A1. The spread device comprises a spreading boom arranged at a self-propelled or towed vehicle, which spreading boom is mounted to be pivotable about a suspension point approximately parallel to a driving direction. The spread boom consists of a middle part and lateral cantilevered arms. The middle part is coupled with a frame section of the vehicle via at least one controllable actuating apparatus. Via at least two points of application, the actuating apparatus induces at least two actuating powers between the middle part and the frame section for the purpose of pivoting the spreading boom within a vertical plane relative to the frame section. Inducment is carried out by overcoming the rotational inertia of the spreading boom and simultaneous reduction of disturbing movements of its center of gravity. In the process, the center of gravity is shifted transversely to the driving direction within the vertical plane. A regulation causes the spreading boom to follow up. The actuating apparatus can be designed as a screw spindle or as a hydraulic construction, for instance.

A spreading device for spreading liquid and/or solid active agents is known from FR 2 270 774 A1. The spread device comprises a spreading boom arranged at a self-propelled or towed vehicle, which spreading boom is mounted to be approximately parallel to a driving direction. The spread boom, consisting of a middle part and lateral cantilevered arms, is connected with a vertical cylinder by means of two pins, with the cylinder being arranged at a suspension point of a frame section to be pivotable about an axis parallel to the driving direction. The opposite end of the vertical cylinder is guided between two horizontal cylinders supporting themselves against the frame section. The vertical cylinder and thus the spread boom can be aligned parallel to the ground by actuating the horizontal cylinder. The spread device provides two operating modes. One operating mode provides aligning the spread boom by a height adjustment of the vertical cylinder and by lateral tilting of the vertical cylinder by means of the horizontal cylinder. Another operating mode provides removing the lower pin in rough terrain such that the spread boom can swing freely.

An ultrasonic sensor controlled height control and position control for a spreading device for spreading liquid and/or solid active agents is known from DE 41 40 254 A1.

The prevention of harmonic couplings in a spreading device for spreading liquid and/or solid active agents is known from WO 2004/041446 A1, in which natural resonant frequencies of the cantilevered arms of a spreading boom, both in an empty state and in a full state of the lines and also during spraying operation, the resonance frequency of a rotary oscillation of the swingingly suspended spreading boom, the resonance frequency of a spring suspension of the vehicle to which the spreading device is fastened, the resonance frequency of active agent sloshing in the tank provided for the agent as well as the resonance frequency of an active agent pump are independent of each other. For this purpose, the cantilevered arms can be constructed to be adjustable in length.

Spreading devices for spreading liquid and/or solid active agents are known from EP 0 157 592 A2. A first spreading device provides a freely swinging suspension of a spreading boom with occasional correction processes taking place, in which the height of the spreading boom above the ground is readjusted according to a specified spacing between the cantilevered arms and the ground. A second spreading device provides a fixed alignment of the spreading boom before, after, and during consecutive correction processes, in which the height of the spreading boom above the ground is readjusted according to a specified spacing between the cantilevered arms and the ground. A third spreading device provides the spreading boom to be suspended passively and the passive suspension to be changeable at least with respect to one suspension property in order to effect a continuous change of alignment of the spreading boom. In this context, the continuous change is carried out slower than the self-stabilizing of the passive suspension.

SUMMARY

The object of the invention is to develop a device, such as, for instance, a field sprayer, for spreading liquid and/or solid active agents with a carrier vehicle and at least one boom with cantilevers projecting on both sides of the carrier vehicle, which boom is arranged pivotably about at least one pivot axis running preferably in parallel to a longitudinal axis of the carrier vehicle, which device enables maintaining as precisely as possible the spacing of the cantilevers in relation to the ground surface, also in the instance of uneven ground and a moving or rolling carrier vehicle, as well as specifying a method for controlling such a device, by means of which method it is made possible to maintain as precisely as possible the spacing of the cantilevers in relation to the ground surface, also in the instance of uneven ground and a moving or rolling carrier vehicle.

The object is solved by the respective features of the independent claims.

Features of further advantageous developments of the invention are indicated in the dependent claims, in the following section with the general description, in the figures as well as in the corresponding section including the description of the figures.

A first object of the invention thus relates to a device for spreading liquid and/or solid active agents. The device comprises:
  a carrier vehicle;
  at least one boom arranged pivotably about at least one pivot axis;
  at least one sensor arrangement for detecting an angular velocity and/or an angular position of the boom about the pivot axis in relation to a reference plane;
  a control unit processing output signals of the sensor arrangements to control signals;
  at least one actuator influencing the present angular position of the boom about the pivot axis based on control signals from the control unit;
  which at least one actuator is formed by at least one linear or rotary actuator operating with fluidic pressure, which linear or rotary actuator produces an actuating connection between the carrier vehicle and the pivotable boom, where the at least one linear or rotary actuator has respectively one active pressure side, which is impingeable with fluidic actuating pressure, for each of the two adjustment directions of the boom;

where an approximately equal pressure level and/or force level prevails in the active pressure sides of two linear or rotary actuators operating in opposition or in the active pressure sides of a double-acting linear or rotary actuator, respectively, when the boom is stationary or moves only slightly in relation to the carrier vehicle, and where a defined differential pressure or a defined differential force, respectively, is adjustable between the active pressure sides of the two linear or rotary actuators operating in opposition or between the active pressure sides of a double-acting linear or rotary actuator, respectively, when the boom is shifted in relation to the carrier vehicle.

Alternatively, it can also be provided that the device with the pivotable boom and the sensor arrangement, which device comprises a carrier vehicle, has an electromotively driven actuator or drive, respectively, or a plurality of electromotively driven actuators or drives, which respectively produces/produce an actuating connection between the carrier vehicle and the pivotable boom, wherein the at least one electrical or electromotively driven linear actuator or rotary actuator has respectively one electromotively engageable active actuating side for each of the two adjustment directions of the boom.

In this instance, a connection is preferably produced between the measured angles of rotation or the angular position, respectively, of the boom and the angular velocity by temporal integration of a measured value of the angular rate, referred to as angular velocity, from which the angle of rotation representing the angular position of the boom in relation to the reference plane can be determined. Disturbances caused by movements of the carrier vehicle or by translational accelerations of any kind have no influence on the calculation in this context, whereas measuring errors are likewise integrated and cause an angle drift of the angle of rotation. Although measurement of the angular position in relation to the reference plane, for instance, by measurement of the relative rotation between the carrier vehicle and the boom or measurement of a tilt angle relative to the acceleration of gravity, has the disadvantage of influences from disturbances caused by rotary movements of the carrier vehicle or by translational accelerations such as occur when driving along curves, for example, this is offset by the advantage that this type of detection of the angular position is not subject to any angle drift.

These measured values are most reasonably acquired in the device according to the invention by at least one sensor arrangement for detecting the angular velocity and/or the angular position of the boom about the pivot axis in relation to the reference plane being formed by at least one angular rate sensor, rotational angular velocity sensor, and/or angular acceleration sensor arranged on the boom. Optionally, the sensor arrangement can also be arranged on the carrier vehicle. It is also conceivable to use two such sensor arrangements on the boom and on the carrier vehicle.

The device according to the invention can provide that the spray boom is mounted at an abutment part such as to swing about an axis, with an angular rate sensor, (gyroscope) being mounted directly on and/or at the spray boom and/or at the carrier vehicle. The present position and the present movements of the boom in relation to a reference plane ("artificial horizon"), which are independent of the carrier vehicle, are determined by means of the gyroscope or by means of the mentioned sensor arrangement, respectively. In this way, it can be achieved that rotary movements or rolling movements of the carrier vehicle (self-propelled or towed field sprayer) do not immediately have a direct influence on the boom because the measured values determined by the gyroscope refer to the rotary movements of the boom in relation to the surface of the earth. In this manner, the sensor arrangement acquires absolute position values, which are excellently suited for detecting and either compensating or damping undesired swing motions and/or deflection motions of the boom.

The at least one actuator can be formed, for instance, by at least one double-acting linear actuator operating with fluidic pressure, which linear actuator produces an actuating connection between the carrier vehicle and the pivotable boom. In this context, a piston of the linear actuator, which piston is coupled with the boom and is movable in a cylinder chamber between two end positions, separates from each other two pressure chambers, which are respectively engageable by fluidic actuating pressure for each of the two adjustment directions of the boom When the boom is stationary or moves only slightly in relation to the carrier vehicle, an approximately equal pressure level or force level, respectively, prevails in these two pressure chambers, as can be preferably detected by means of suitable pressure sensors and evaluated in the regulating circuit together with the measured values from the sensor arrangement or from the angular rate sensor or gyroscope, respectively. If the boom is intended to move in relation to the carrier vehicle, however, the double-acting cylinder is engaged by actuating pressure such that a defined differential pressure or a defined differential force, respectively, is adjustable between the two pressure chambers of the double-acting linear actuator when the boom is shifted or is to be adjusted in relation to the carrier vehicle.

In the instance of swinging suspensions, the proposed spray boom control can thus be carried out with at least one cylinder, for example, with which the spray boom can be respectively adjusted in relation to the pendulum swing. On the one hand, the cylinder is connected to the spray boom and, on the other hand, to the abutment part. The abutment part can also be part of a vehicle, a frame part of a plant protection sprayer, for example.

An alternative embodiment variant of the device according to the invention can provide that the mentioned actuator is formed by at least two linear actuators operating in opposition and each operating with fluidic pressure, which linear actuators produce an actuating connection between the carrier vehicle and the pivotable boom, with each of the two linear actuators having respectively one pressure chamber, and with respectively one of the two linear actuators being engaged by fluidic actuating pressure for respectively one specified adjustment direction of the boom. In this variant, too, an approximately equal pressure level and/or force level prevails in the two pressure chambers of the two linear actuators when the boom is stationary or moves only slightly in relation to the carrier vehicle. In contrast, if the boom is shifted or is to be adjusted in relation to the carrier vehicle, a defined differential pressure or a defined differential force, respectively, is adjustable between the two pressure chambers of the two linear actuators.

The mentioned cylinders, that is, the at least one double-acting cylinder or the at least two single-acting cylinders, for example, can be optionally engaged and operated with hydraulic or pneumatic pressure. Also conceivable are hydropneumatic actuating devices, as the case may be.

The at least one actuator can be formed by at least one double-acting, electromotively operating linear actuator, for example, which linear actuator produces an actuating connection between the carrier vehicle and the pivotable boom. In this instance, an actuating drive of the linear actuator, which actuating drive is coupled with the boom and is movable between two end positions, separates two actuating sides from each other, which are respectively engaged by electromotive actuating power for each of the two adjustment directions of the boom. When the boom is stationary or moves only slightly in relation to the carrier vehicle, an approximately equal force level is applied at these two actuating sides, as can be preferably detected by means of suitable sensors and evaluated in the regulating circuit together with the measured values of the sensor arrangement or of the angular rate sensor or gyroscope, respectively. If the boom is intended to move in relation to the carrier vehicle, however, the double-acting actuating drive is engaged by actuating power such that a defined differential force is adjustable between the two actuating sides of the double-acting linear actuator when the boom is shifted or is to be adjusted in relation to the carrier vehicle. In electromotive drives of such a type, the prevailing actuating powers or the actuating powers to be applied, respectively, can advantageously be detected by means of an evaluation of the current flows required for the drives. Since the current consumption respectively changes with the counterforces prevailing in the system, very precise assertions regarding the respective actuating powers can be acquired from the evaluation of the current flow.

In the instance of swinging suspensions, the proposed spray boom regulation can thus be carried out with at least one electromotive actuating drive, for example, with which the spray boom can be respectively adjusted in relation to the pendulum swing. On the one hand, the actuating drive is connected to the spray boom and, on the other hand, to the abutment part. The abutment part can also be part of a vehicle, a frame part of a plant protection sprayer, for example.

An alternative embodiment variant of the device according to the invention can provide that the mentioned actuator is formed by at least two linear actuators operating in opposition and each operating with electromotive driving force, which linear actuators produce an actuating connection between the carrier vehicle and the pivotable boom, with each of the two linear actuators having respectively one actuating side, and with respectively one of the two linear actuators being engaged by electromotive driving force for respectively one specified adjustment direction of the boom. In this variant, too, an approximately equal force level prevails at the two actuating sides of the linear actuators when the boom is stationary or moves only slightly in relation to the carrier vehicle. In contrast, if the boom is shifted or is to be adjusted in relation to the carrier vehicle, a defined differential force is adjustable between the two actuating sides of the two linear actuators.

The mentioned drives, that is, the at least one double-acting actuating drive or the at least two single-acting actuating drives, are operated electromotively, for example. It should be noted here that the same principles can be applied to rotary actuators (one-sided or double-acting) such that the mentioned variants can be read and should thus be understood to apply in a corresponding manner to electromotive rotary actuators.

The alternative variant of the device according to the invention thus provides that the at least one actuator is formed by at least one double-acting, electromotively operating linear actuator, which produces an actuating connection between the carrier vehicle and the pivotable boom, where a section of the linear actuator, which is coupled with a boom and is movable between two end positions, has two actuating sides, which are respectively enaged by electromotive actuating power for each of the two adjustment directions of the boom. In this instance, an approximately equal force level is applied at the two actuating sides when the boom is stationary or moves only slightly in relation to the carrier vehicle. Likewise, if the boom is shifted in relation to the carrier vehicle, a defined differential force is adjustable between the two actuating sides of the double-acting actuating drive.

In addition, the device can be equipped such that the actuator is formed by at least two linear actuators operating in opposition and each operating electromotively, which linear actuators produce an actuating connection between the carrier vehicle and the pivotable boom, with each of the two linear actuators having respectively one actuating side or drive side, and with respectively one of the two linear actuators being engageable with an electromotively generated driving force for respectively one specified adjustment direction of the boom. An approximately equal force level is applied at both actuating sides of the two linear actuators when the boom is stationary or moves only slightly in relation to the carrier vehicle. When the boom is shifted in relation to the carrier vehicle, a defined differential force is adjustable between the two actuating sides or drive sides of the two linear actuators.

The following aspects can be particularly pointed out as essential differences of the device for spreading liquid and/or solid active agents according to the invention in comparison to the known spray devices:

The invention provides a spray boom, which is suspended at a support frame to be rotatable or swingable about a pivot axis approximately parallel to the vehicle axle. At least one preferably pneumatic actuating element (possibly also hydraulic) is additionally arranged between the spray boom and the support frame. The pressures are determined in each of the two cylinder chambers, for instance, by means of suitable differential pressure sensors or also by a plurality of pressure sensors. As an alternative, strain gauges can be used on the piston rods or at connection points or the like.

During phases when no adjustment of the boom is necessary, the differential pressure or the resulting differential force, respectively, is regulated to approximately zero, so that no or no noteworthy force is induced to the boom. If it is necessary, however, to adjust the boom about its pivot axis due to the driving situation of the device in uneven terrain or at a slope, for instance, it is regulated to a defined differential pressure (differential force). The detection of the angular velocity can be carried out, in particular, via the gyroscope. The angle of rotation can be calculated by integration of the angular velocity.

In addition, slight rotary movements or rolling movements, respectively, are not immediately actively readjusted, and the damping of the boom can in this context be effected by air compression in the at least one pneumatic cylinder. Optionally, the connection between the cylinder and the boom can also be effected by means of an elastomer or by way of a slot with a corresponding spring or damping element.

As an alternative to two pneumatic cylinders, it is also possible to use a double-acting cylinder, for example, a hydraulically operating cylinder. A cylinder could thus be used that is engaged by pressure on both the side of the piston crown and the side of the piston rod. Again, a differential pressure between the side of the piston crown and the side of the piston rod could be measured here, where this cylinder can already have a differential pressure in the zero position due to the different cross sections. If the measured differential pressure, however, exceeds a defined value, the boom can again be actively readjusted. In this context, the boom is preferably regulated to a certain differential pressure based on the values specified by the gyroscope.

Alternatively to measuring the differential pressure, it is also conceivable to provide the at least one cylinder with a position sensor system so that movements of the boom can be determined not via a differential pressure, but rather via a length change of the actuating element. If this length change exceeds a defined value, the boom can be actively readjusted or the boom is regulated, respectively, to a certain length of the actuating element based on the values specified by the gyroscope.

A further alternative to measuring the differential pressure would be the use of at least one strain gauge, which is mounted on the piston rod of the at least one actuating element, for example. If there is no movement of the spray boom or if no active regulation is required, respectively, the strain gauge determines no or only a small traction force and/or compressive force, respectively. If a defined traction force or compressive force is exceeded, the boom can be actively readjusted or the boom is regulated, respectively, to a certain traction force and/or compressive force based on the values specified by the gyroscope.

In addition to the above described device for spreading solid and/or liquid active agents, the present invention furthermore proposes a method with the features of the independent claim 10 in order to fulfill the above object. This method according to the invention serves, in particular, for controlling a device according to one of the previously described embodiment variants and provides a regulation of the angular position of the boom arranged movably about a pivot axis on a carrier vehicle, namely a regulation based on a present angular position and/or a measured differential force in at least two pressure chambers of at least one actuator operating with fluidic pressure, where a differential pressure is minimal and the actuator builds no or only a minimal actuating power between the carrier vehicle and the boom when the boom is stationary or moves only slightly out of its rest position,
and where a definable differential pressure builds up between the two pressure chambers when the boom is to be adjusted,
where a present angular velocity and/or angular position of the boom about the pivot axis in relation to a reference plane is determined by means of at least one sensor arrangement,
which comprises an angular rate sensor, a rotational angular velocity sensor, and/or an angular acceleration sensor arranged on the boom or on the carrier vehicle.

In one variant of the method, both the measurement data of the at least one sensor arrangement and the differential pressures between the two pressure chambers of the at least one actuator are used for determining a present angular position and/or a desired angular position between the boom and the carrier vehicle and are processed by a control unit, which controls the at least one actuator based on these measurement data, which actuator changes the boom position in the desired manner such that the boom, in particular, retains or assumes, as the case may be, its horizontal position when the ground is even or its position parallel to an inclined ground, respectively.

Additionally, it should be noted here that the distribution device according to the invention can preferably be an agricultural distribution machine, in particular a field sprayer for spreading liquid plant protection products and/or fertilizers, and also solid active agents, as the case may be, which can be spread, for instance, in a an atomized form. The field sprayer can be designed, for instance, as a self-propelled machine or as a machine arranged at a towing vehicle or hitched onto it, respectively. Normally, the field sprayer essentially consists of a frame for carrying the individual assemblies, a storage vessel for carrying along the spray liquid to be spread, a computer unit for controlling the individual machine elements as well as a distribution device or spray boom, respectively, extending transversely to the driving direction, which distribution device or spray boom is height adjustable in relation to the frame by means of actuating elements and rotatable about a horizontal longitudinal axis. A plurality of so-called nozzle holders is arranged evenly spaced apart on the distribution device. Mounted at these nozzle holders, in turn, is at least one spray nozzle, respectively, however, as a rule, a plurality of spray nozzles for distributing the plant protection liquid and/or the fertilizing liquid. For this purpose, the spray nozzles produce a spray cone, which is directed toward the plant growth. The control of the actuating elements for the height adjustment as well as for controlling the desired nozzle holders or spray nozzles, respectively, is carried out, for example, by way of spreading patterns or spreading profiles, respectively, which are stored in a computer system.

Preferably, a suitable angular rate sensor or also a plurality of angular rate sensors, which is/are mounted directly on the boom, can be used for detecting the angular velocity in the device according to the invention. Rotary movements of the carrier vehicle thus have no influence in determining the angular velocity of the boom. An output signal of an angular rate sensor, which output signal is proportional to the measurand or reflects it, thus corresponds to the rotary movement of the boom in relation to any optional reference plane, for example in relation to the surface of the earth or to a long-term orientation of the carrier vehicle reflecting an averaged ground profile.

This measurand or an output signal of an angular rate sensor detecting the angular velocities of the boom, which output signal is integrated into the control signals to the actuator or actuators and serves as an input variable for the control unit, and which output signal is proportional to this measurand or reflects it, can be used for the purpose of attaining an active damping of the boom in the form of an actively induced brake torque.

Alternatively or additionally, the at least one sensor arrangement for detecting an angular velocity of the boom about the pivot axis in relation to a reference plane can comprise at least one angular rate sensor arranged on the carrier vehicle for the purpose of measuring angular velocities of the carrier vehicle at least about its longitudinal axis and thus measuring rotary movements representing disturbances of the carrier vehicle. This means that an additional angular rate sensor can optionally also be employed at the carrier vehicle, thus enabling a comparison of the measured values for an even better position determination and/or angle determination of the boom.

Additionally, the at least one sensor arrangement for detecting an angular velocity of the boom about the pivot axis in relation to a reference plane can in this instance comprise at least one angle of rotation sensor or rotational angular velocity sensor, which detects the relative rotation between the carrier vehicle and the boom, such that the absolute angular velocity of the boom about the pivot axis can then be determined from the two measured values of the angular velocity of the carrier vehicle in relation to its longitudinal axis and the relative rotation between the carrier vehicle and the boom.

Alternatively or in addition to an angular rate sensor, the at least one sensor arrangement for detecting an angular velocity of the boom about the pivot axis in relation to a reference plane can comprise an angular acceleration sensor. A measure for the angular velocity can be obtained by temporal integration of this sensor output signal.

In summary, it is thus obvious that the means for determining an angular velocity of the boom about the pivot axis in relation to a reference plane can comprise one or a plurality of inertial sensors arranged on the boom.

Inertial sensors serve for measuring accelerations and angular rates. By combining a plurality of inertial sensors in an inertial measurement unit, also referred to as IMU, accelerations can be measured in up to six degrees of freedom that a rigid body can have (three translational and three rotational degrees of freedom). An IMU is the main component of an inertial navigation system, also referred to as INS.

Examples of inertial sensors are acceleration sensors and angular rate sensors.

An angular rate sensor detects the rotational speed or angular velocity, respectively, of a body about a specified rotation axis or pivoting axis, with an output signal of an angular rate sensor being preferably uniquely proportional to a detected angular velocity.

By integration of the angular velocity over a time interval, it is possible to derive the angle by which the body has rotated in that time interval. The angular rates about the three spatial axes are termed as:
  yaw rate (rotation about the vertical axis),
  pitch rate (rotation about the lateral axis), and
  roll rate (rotation about the longitudinal axis).

The measuring principle is essentially based on two measuring principles, on the one hand, on the Coriolis force, which acts on a mechanically moving system, and on the other hand, on the Sagnac effect, which can be observed with light.

Examples of mechanical, moving systems using the Coriolis force are:
  Foucault pendulum;
  gyrocompass;
  dynamically tuned gyroscope (DTG), measurement error <1°/h;
  vibrating structure gyroscope, measurement error <10°/h; and
  halteres.

Examples of optical systems using the Sagnac effect are:
  ring laser gyroscope (RLG), measurement error <0,001°/h;
  fiber optic gyroscope (FOG), measurement error <1°/h.

As a rule, inertial measurement units contain the following sensor types:
  Three orthogonally arranged acceleration sensors (also referred to as translational sensors) detect the linear acceleration in the x or y or z axis, respectively. From this, the translational movement can be calculated by double integration.
  Three orthogonally arranged angular rate sensors (also referred to as gyroscopic sensors) measure the angular velocity about the x or y or z axis, respectively. From this, the rotational motion can be calculated by single integration.

Magnetic field sensors, for instance, such as compass sensors, can be additionally provided for determining the constant of integration and/or for improving the accuracy and/or and or for correcting a drift of the sensors, and/or for receiving signals from an existing and/or future global navigation satellite system, also abbreviated as GNSS, such as:
  GPS (Global Positioning System) of the United States of America, and/or
  GLONASS (GLObal NAvigation Satellite System) of the Russian Federation, and/or
  Galileo of the European Union, and/or
  BeiDou of the People's Republic of China.

The at least one sensor arrangement for detecting an angular position of the boom about the pivot axis in relation to the reference plane can comprise at least one sensor, which detects a relative rotation between the carrier vehicle and the boom in relation to the pivot axis.

At least one sensor for detecting a relative rotation between the carrier vehicle and the boom can be an angle of rotation sensor arranged between the boom and the carrier vehicle.

Alternatively or additionally, detection of a relative rotation between the carrier vehicle and the boom can be realized by means of at least one tilt sensor, which detects an angle between the carrier vehicle and the reference plane, and by means of at least one tilt sensor, which detects an angle between the boom and the reference plane, where the difference of the angle between the carrier vehicle and the reference plane and the angle between the boom and the reference plane, as detected by the sensors, is proportional to the relative rotation between the carrier vehicle and the boom.

The invention allows a very accurate determination of a present angular position of the boom in relation to a reference plane. In comparison to determining the angular position by means of a plurality of ultrasonic sensors, this is less elaborate and less cost-intensive.

In addition, the device can comprise an actuator influencing an average spacing of the boom in relation to the ground or to the growth based on control signals from the regulation apparatus, for instance in the form of one or a plurality of hydraulic cylinders, which actuator converts control signals into mechanical motion or into another physical quantity, such as, for instance, pressure, and thus exerts a force on the boom, which force raises or lowers the boom.

Furthermore, the device can comprise at least one sensor arrangement for detecting at least one average distance of the boom in relation to the ground or to the growth. Preferably, such a sensor arrangement comprises at least one distance sensor arranged at one end of a cantilever of the boom. By means of this distance sensor and an appropriate consideration of its output signals in producing control signals by way of the control unit, it is possible to increase the reliability with which it can be prevented that the boom or spreading means for solid and/or liquid active agents arranged thereon, such as, for example, spray nozzles, come into contact with the ground and/or with the growth.

Alternatively or additionally, such a sensor arrangement can comprise at least one distance sensor arranged at the part of the boom not projecting beyond the width of the carrier vehicle.

By means of the distance signals of the sensors, the control unit can produce control signals provided at least for the actuator to influence at least one average distance of the boom in relation to the ground or to the growth.

In order to exclude influences from uneven mass distributions of the boom as far as possible, the pivot axis preferably runs through the center of gravity of the boom.

The at least one boom can be arranged on the carrier vehicle in a permanent manner or so as to be exchangeable for another apparatus for agricultural soil treatment and/or growth treatment.

In this context, the carrier vehicle can be driven or towed such that the device:
- forms a self-propelled agricultural unit or an agricultural self-drive unit, respectively, in the instance of a driven carrier vehicle with a permanently arranged boom;
- forms a towed agricultural unit, such as, for instance, an agricultural trailer, in the instance of a towed carrier vehicle with a permanently arranged boom; and
- forms either an attachment unit or a mounting unit in the instance of a driven carrier vehicle with a boom that is arranged so as to be exchangeable for another apparatus for agricultural soil treatment and/or growth treatment, for instance at a three-point hitch or on a loading platform provided for this purpose.

Additional advantages in comparison to the prior art over and above those already mentioned will result from completely solving the proposed task together with the remedy of any disadvantages of the prior art.

Moreover, it is reliably prevented that the cantilevers come into contact with the ground by precisely maintaining the distances of the cantilevers in relation to the ground surface and/or to the growth, independent of the moving and/or rolling carrier vehicle.

All of the mentioned measurement data provided by the acceleration sensors and/or by the gyroscopes or other such measurement arrangements are preferably checked against the measured values for pressure, force, and/or strain from the at least one actuating element, which is arranged between the boom and the carrier vehicle, and which preferably provides no differential pressure or no or only low force values, respectively, in the instance of a stationary boom.

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

DETAILED DESCRIPTION

The same or equivalent elements of the invention are designated by identical reference characters. Furthermore and for the sake of clarity, only the reference characters relevant for describing the respective figure are provided. It should be understood that the detailed description and specific examples of the device or of the method according to the invention are intended for purposes of illustration only and are not intended to limit the scope of the invention.

Figure 1:
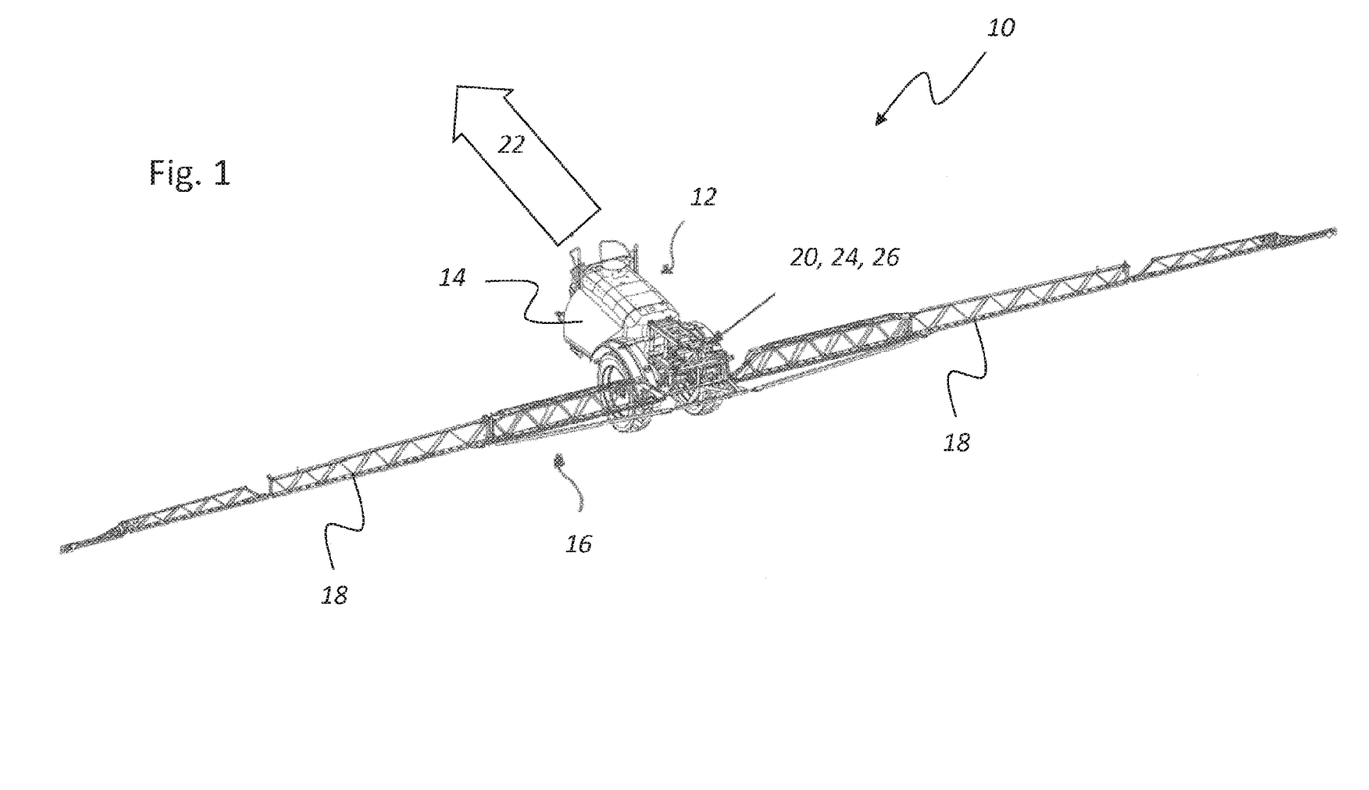
FIG. 1 shows a schematic perspective view of an embodiment variant of an agricultural distribution device formed by an agricultural carrier vehicle, which is equipped with a spray boom.

The schematic perspective view in FIG. 1 shows a conceivable embodiment variant of an agricultural distribution device 10 formed by a towed agricultural carrier vehicle 12 with a tank 14 for a spreading liquid and with a spray boom 16 suspended at the rear-end, which spray boom 16 has two symmetrically designed cantilevered arms 18, which are equipped with nozzle holders, which are not discernible here, and with spray nozzles integrated therein for atomizing the spreading liquid, for example, the spraying agent. On the one hand, the suspension 20 of the spray boom 16 at the frame enables rotation of the boom 16 about an horizontal longitudinal axis, which is oriented in parallel to the driving direction 22, and on the other hand allows the boom 16 to be horizontally aligned or aligned in parallel to the ground surface, respectively, when the suspension 20 rotates or moves in any manner, in particular due to bumps, uneven terrain, etc.

Figure 2:
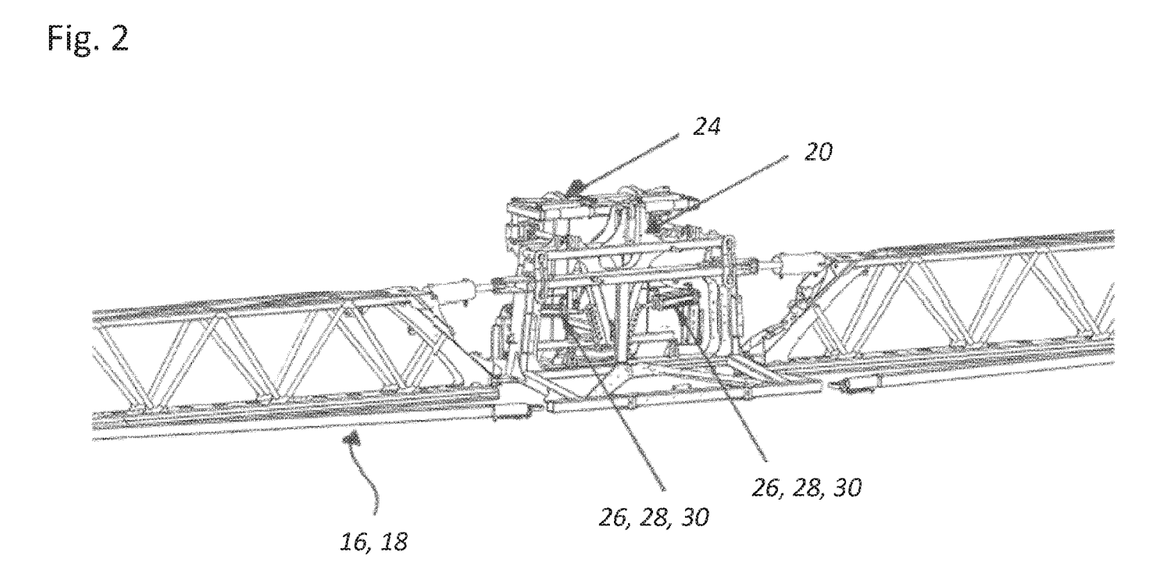
FIG. 2 shows a detailed view of a suspension of the boom at the carrier vehicle.
Figure 3:
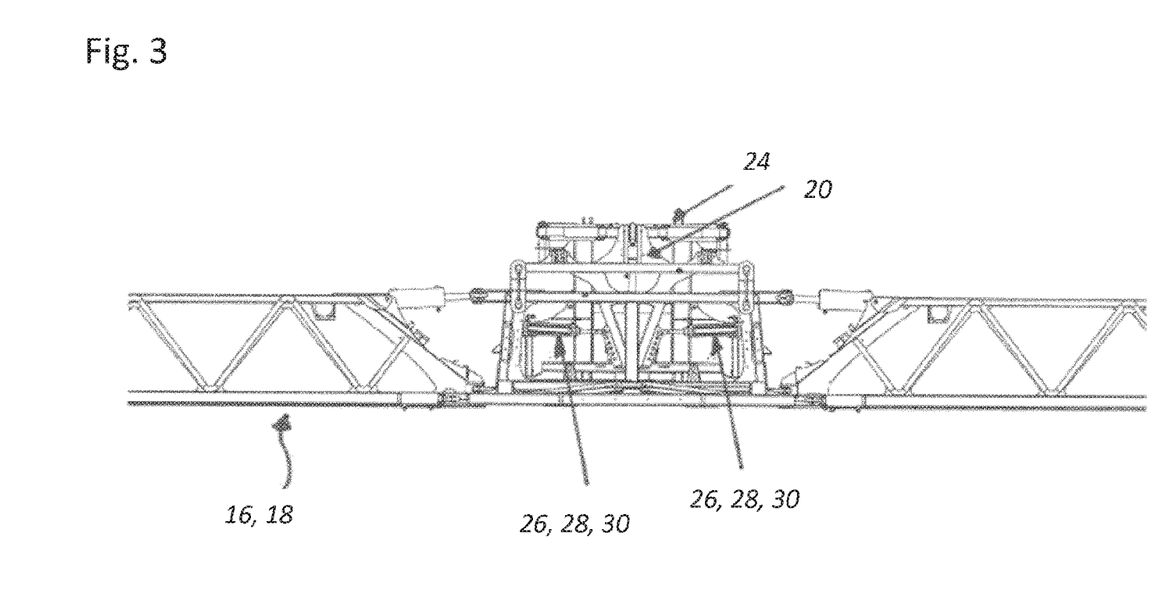
FIG. 3 shows a further schematic detailed view of a suspension of the boom at the carrier vehicle.

As the detailed views of FIG. 2 and FIG. 3 show, the boom 16, which is suspended to swing or rotate, respectively, about the pivot axis (in parallel to the driving direction 22) at the suspension 20 at the carrier frame 24 of the carrier vehicle 12, is coupled with the carrier frame 24 by pneumatic or hydraulic actuating elements 26. In the exemplary embodiment shown here, the actuating elements 26 are formed by two separate hydraulic or pneumatic linear cylinders 28 operating in opposition, which are each associated with pressure sensors 30 and/or position sensors. In the two pressure chambers of the actuating cylinders 28, the pressures can be detected by means of pressure sensors 30, respectively (a differential pressure sensor or two pressure sensors); as the case may be, the movement difference or length difference, respectively, of the extending and shortening actuating element 26 can also be detected by means of the position sensors or also by means of strain gauges on the piston rods or at their connections to the boom 16 and/or at the suspension 20.

Figure 4:
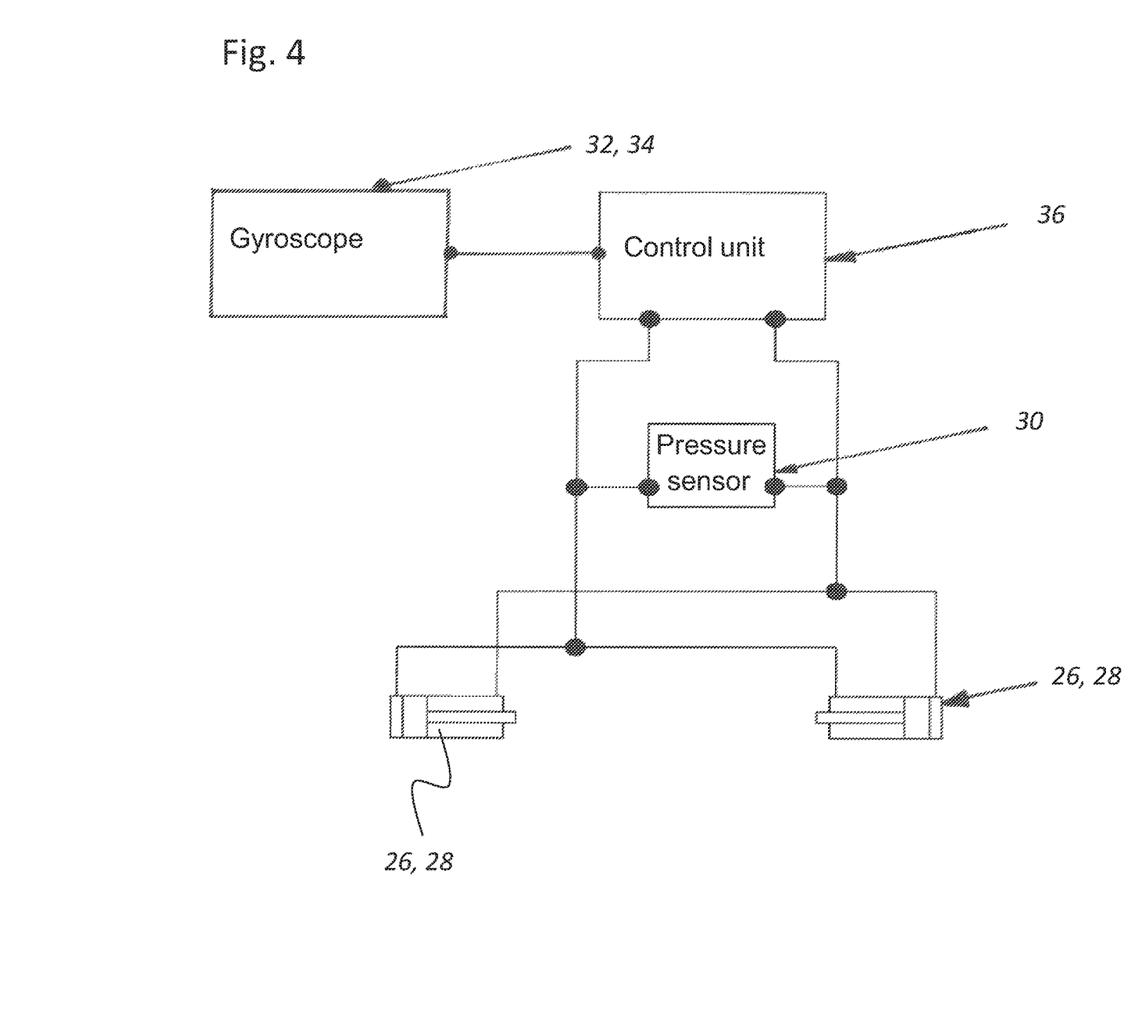
FIG. 4 shows a schematic block diagram with the most important components for adjusting the boom hinged at the carrier vehicle.

The schematic block diagram of FIG. 4 illustrates the switching of the components in a deflection of the boom 16, which is hinged at the carrier vehicle 12, to the one or other side or for it being held in a horizontal position, respectively, with the carrier vehicle 12 moving while driving over uneven terrain, for example.

The pressures are determined in each of the two pressure chambers of the actuating cylinders 28, optionally by means of a differential pressure sensor 30 or by two pressure sensors. If no adjustment of the boom 16 is necessary, the differential pressure is regulated to a minimum value or to zero, respectively, such that no actuating power is induced into the boom 16. If, however, an adjustment of the spray boom 16 relative to the suspension 20 about a pivot axis is required, a defined differential pressure or a defined differential force, respectively, is adjusted or such a value is regulated, respectively.

The movements of the spray boom 16, in particular, its present angular velocities (absolute values) are, in the process, detected via the sensor arrangement 32, in particular via a gyroscope 34, which transmits its measured values to the control unit 36. By integration of the detected angular velocity, the angle of rotation that is to be achieved for the spray boom 16 by the angulation of the actuating element 26 or the actuating elements 26, respectively, can be calculated.

Furthermore, it can preferably be provided that slight rotary movements or rolling movements, respectively, are not immediately actively readjusted, wherein the damping of the boom 16 can be effected by air compression (for pneumatic actuating cylinders 28) in the actuating elements 26 in this context. The control unit or regulating unit 36, respectively, moreover analyzes the measured values provided by the pressure sensors 30—for example, also a differential force sensor—and correspondingly controls the actuating cylinders 28.

In the exemplary embodiment shown here, two pneumatic cylinders 28 operating in opposition are provided as actuating elements 26, with one cylinder 28 being provided for each direction of rotation. As an alternative actuating arrangement, a double-acting actuating cylinder acting in both work directions (back and forth) can also be employed, where a hydraulically operating cylinder, for example, can be used. A cylinder could thus be used that can be engaged by pressure on both the side of the piston crown and the side of the piston rod. Again, a differential pressure between the side of the piston crown and the side of the piston rod could be measured in this context, where this cylinder can already have a differential pressure in the zero position due to the different cross sections. If this differential pressure, however, exceeds a defined value, the boom can again be actively readjusted. As the case may be, the boom 16 is preferably regulated to a certain differential pressure based on the values specified by the gyroscope 34.

An alternative to measuring the differential pressure would be the use of at least one strain gauge, which can be mounted on the piston rod of the at least one actuating element 26, for example. If there is no movement of the spray boom 16 or if no active regulation is required, the strain gauge determines no or only a small traction force and/or compressive force. If a defined traction force or compressive force is exceeded, the boom 16 can be actively readjusted or the boom 16 is regulated, respectively, to a certain traction force and/or compressive force based on the values specified by the gyroscope.

It should be noted here once more that, instead of the pressure cylinders shown in the figures, electromotive actuating drives can likewise be used, as explained in detail above in the general section of the description.

The invention has been described with reference to a preferred embodiment. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

LIST OF REFERENCE CHARACTERS

10 Distribution device
12 Carrier vehicle
14 Tank
16 Boom, spray boom
18 Cantilevered arms
20 Suspension
22 Driving direction
24 Carrier frame
26 Actuating element
28 Linear cylinder, hydraulic cylinder, pneumatic cylinder
30 Differential pressure sensor, pressure sensor
32 Sensor arrangement
34 Gyroscope
36 Control unit, regulating unit

The invention claimed is:

1. A device for spreading liquid and/or solid active agents, comprising:
a carrier vehicle,
at least one boom arranged pivotably about at least one pivot axis,
at least one sensor arrangement for detecting an angular velocity and/or an angular position of the boom about the pivot axis in relation to a reference plane,
a control unit processing output signals of the sensor arrangements to control signals,
at least one actuator influencing the present angular position of the boom about the pivot axis based on control signals from the control unit,
which at least one actuator is formed by at least one linear or rotary actuator operating with fluidic pressure or electromotively, which produces an actuating connection between the carrier vehicle and the pivotable boom, wherein the at least one linear or rotary actuator has respectively one active pressure side or actuating side, which is engageable by fluidic actuating pressure or with electromotive driving force, for each of the two adjustment directions of the boom,
wherein an approximately equal pressure level and/or force level is adjustable in the active pressure sides or actuating sides, respectively, of two linear or rotary actuators operating in opposition or of a double-acting linear or rotary actuator, respectively, when the boom is stationary or moves only slightly in relation to the carrier vehicle,
and wherein a defined differential pressure or differential force, respectively, is adjustable between the active pressure sides or actuating sides, respectively, of the two linear or rotary actuators operating in opposition or of the double-acting linear or rotary actuator, respectively, when the boom is shifted in relation to the carrier vehicle.

2. The device as recited in claim 1, in which the at least one sensor arrangement for detecting the angular velocity and/or the angular position of the boom about the pivot axis in relation to the reference plane comprises at least one angular rate sensor, rotational angular velocity sensor, and/or angular acceleration sensor arranged on the boom.

3. The device as recited in claim 1, in which the at least one sensor arrangement for detecting the angular velocity and/or the angular position of the boom about the pivot axis in relation to the reference plane comprises at least one angular rate sensor, rotational angular velocity sensor, and/or angular acceleration sensor arranged on the carrier vehicle.

4. The device as recited in claim 1, in which the at least one actuator is formed by at least one double-acting linear actuator operating with fluidic pressure, which produces an actuating connection between the carrier vehicle and the pivotable boom, wherein a piston of the linear actuator, which piston is coupled with a boom and is movable in a cylinder chamber between two end positions, separates from each other two pressure chambers, which are engageable by fluidic actuating pressure for each of the two adjustment directions of the boom, respectively.

5. The device as recited in claim 4, in which an approximately equal pressure level and/or force level prevails in the two pressure chambers when the boom is stationary or moves only slightly in relation to the carrier vehicle.

6. The device as recited in claim 4, in which a defined differential pressure is adjustable between the two pressure chambers of the double-acting linear actuator when the boom is shifted in relation to the carrier vehicle.

7. The device as recited in claim 1, in which the actuator is formed by at least two linear actuators operating in opposition and each with fluidic pressure, which linear actuators produce an actuating connection between the carrier vehicle and the pivotable boom, wherein each of the two linear actuators respectively has a pressure chamber, and wherein respectively one of the two linear actuators is engageable by fluidic actuating pressure for respectively one specified adjustment direction of the boom.

8. The device as recited in claim 7, in which an approximately equal pressure level and/or force level prevails in the two pressure chambers of the linear actuators when the boom is stationary or moves only slightly in relation to the carrier vehicle.

9. The device as recited in claim 7, in which a defined differential pressure is adjustable between the two pressure chambers of the two linear actuators when the boom is shifted in relation to the carrier vehicle.

10. The device as recited in claim 1, in which the at least one actuator is formed by at least one double-acting, electromotively operating linear actuator, which produces an actuating connection between the carrier vehicle and the pivotable boom, wherein a section of the linear actuator, which is coupled with a boom and is movable between two end positions, has two actuating sides, which are engageable by electromotive actuating power for each of the two adjustment directions of the boom, respectively.

11. The device as recited in claim 10, in which an approximately equal force level is applied at the two actuating sides when the boom is stationary or moves only slightly in relation to the carrier vehicle.

12. The device as recited in claim 10, in which a defined differential force is adjustable between the two actuating sides of the double-acting actuating drive when the boom is shifted in relation to the carrier vehicle.

13. The device as recited in claim 1, in which the actuator is formed by at least two linear actuators operating in opposition and each operating electromotively, which linear actuators produce an actuating connection between the carrier vehicle and the pivotable boom, wherein each of the two linear actuators has respectively one actuating side or drive side, and wherein respectively one of the two linear actuators is engageable by an electromotively generated driving force for respectively one specified adjustment direction of the boom.

14. The device as recited in claim 13, in which an approximately equal force level is applied at the two actuating sides of the two linear actuators when the boom is stationary or moves only slightly in relation to the carrier vehicle.

15. The device as recited in claim 13, in which a defined differential force is adjustable between the two actuating sides or drive sides of the two linear actuators when the boom is shifted in relation to the carrier vehicle.

16. A method for controlling a device as recited in claim 1 by means of regulation of the angular position of the boom arranged movably about a pivot axis on a carrier vehicle based on a present angular position and/or a measured differential pressure in at least two pressure chambers of at least one actuator operating with fluidic pressure or at the at least two actuating sides of an electromotively operated actuator, respectively, wherein a differential pressure or a differential force, respectively, is minimal and the actuator builds no or only a minimal actuating power between the carrier vehicle and the boom when the boom is stationary or moves only slightly out of a rest position, and wherein a definable differential pressure and/or a definable differential force is built up between the two pressure chambers or actuating sides for a boom that is to be adjusted, wherein a present angular velocity and/or angular position of the boom about the pivot axis in relation to a reference plane is determined by means of at least one sensor arrangement, which comprises an angular rate sensor, a rotational angular velocity sensor, and/or an angular acceleration sensor arranged on the boom or on the carrier vehicle.

17. The method as recited in claim 16, in which both the measurement data of the at least one sensor arrangement and the differential pressures between the two pressure chambers of the at least one actuator are used for determining a present angular position and/or a desired angular position between the boom and the carrier vehicle and are processed by a control unit, which controls the at least one actuator.

18. The method as recited in claim 16, in which both the measurement data of the at least one sensor arrangement and the differential forces between the two actuating sides of the at least one actuator are used for determining a present angular position and/or a desired angular position between the boom and the carrier vehicle and are processed by a control unit, which controls the at least one actuator.

19. A device for spreading liquid and/or solid active agents, comprising:
a carrier vehicle;
at least one boom arranged pivotably about at least one pivot axis;
at least one sensor arrangement for detecting an angular velocity and/or an angular position of the boom about the pivot axis in relation to a reference plane;
a control unit processing output signals of the sensor arrangements to control signals;
at least one actuator influencing the present angular position of the boom about the pivot axis based on control signals from the control unit;
wherein the least one actuator comprises at least one linear or rotary actuator operating electromotively which produces an actuating connection between the carrier vehicle or the carrier frame and the pivotable boom, wherein the at least one linear or rotary actuator has respectively one active actuating side, which is engageable by electromotive driving force, for each of two adjustment directions of the boom; and
wherein an approximately equal force level is adjustable in the active actuating sides of two linear or rotary actuators operating in opposition or of a double-acting linear or rotary actuator, respectively, when the boom is stationary or moves only slightly in relation to the carrier vehicle or to the carrier frame;
and wherein a defined differential force is adjustable between the active actuating sides of the two linear or rotary actuators operating in opposition or of the double-acting linear or rotary actuators, respectively, when the boom is shifted in relation to the carrier vehicle or to the carrier frame.

20. A method for controlling a device as recited in claim 19 by means of regulation of the angular position of the boom arranged movably about a pivot axis on the carrier vehicle based on a present angular position and/or a measured differential force at at least two actuating sides of the electromotively operated actuator,
- wherein a differential force is minimal and the actuator builds no or only a minimal actuating power between the carrier vehicle and the boom when the boom is stationary or moves only slightly out of a rest position;
- wherein a definable differential force is built up between the two actuating sides of the boom that is to be adjusted; and
- wherein a present angular velocity and/or angular position of the boom about the pivot axis in relation to a reference plane is determined by means of at least one sensor arrangement which comprises an angular rate sensor, a rotational angular velocity sensor, and/or an angular acceleration sensor arranged on the boom or on the carrier vehicle.

* * * * *